US008818006B2

(12) United States Patent
Yamauchi et al.

(10) Patent No.: US 8,818,006 B2
(45) Date of Patent: Aug. 26, 2014

(54) SPEAKER SYSTEM, ELECTRONIC APPARATUS USING SAME, AND MOBILE BODY DEVICE

(71) Applicant: Panasonic Corporation, Osaka (JP)

(72) Inventors: Kenji Yamauchi, Mie (JP); Masatoshi Okuyama, Mie (JP); Shoji Nakajima, Mie (JP); Satoshi Takayama, Mie (JP); Satoshi Koura, Mie (JP); Yachiyo Shimokawatoko, Mie (JP); Kazuhiro Oshika, Mie (JP); Hideaki Inoue, Mie (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/035,956

(22) Filed: Sep. 25, 2013

(65) Prior Publication Data
US 2014/0029779 A1    Jan. 30, 2014

Related U.S. Application Data

(63) Continuation of application No. PCT/JP2012/002797, filed on Apr. 24, 2012.

(30) Foreign Application Priority Data

May 18, 2011 (JP) ................................ 2011-110938

(51) Int. Cl.
| | | |
|---|---|---|
| *H04R 25/00* | (2006.01) | |
| *H04R 1/02* | (2006.01) | |
| *H04R 9/06* | (2006.01) | |
| *H04R 1/20* | (2006.01) | |
| *H04R 1/00* | (2006.01) | |
| *H04R 11/02* | (2006.01) | |
| *B60R 11/02* | (2006.01) | |
| *H04N 5/64* | (2006.01) | |

(52) U.S. Cl.
CPC .............. *H04R 1/02* (2013.01); *B60R 11/0217* (2013.01); *H04N 5/642* (2013.01)
USPC ........... 381/152; 381/186; 381/335; 381/342; 381/386; 381/395; 381/409; 381/424

(58) Field of Classification Search
CPC .......... H04R 1/025; H04R 5/02; H04R 1/026; H04R 2201/021; H04R 1/06; H04R 9/06; H04R 9/045; H04R 1/24; H04R 9/063; H04R 7/122; H04R 7/12; H04R 1/403; H04R 1/02; H04R 1/30; H04R 1/345
USPC ......... 381/152, 186, 386, 395, 409, 424, 335, 381/342
See application file for complete search history.

(56) References Cited

U.S. PATENT DOCUMENTS

| | | | |
|---|---|---|---|
| 5,225,639 A | | 7/1993 | Kobayashi et al. |
| 5,790,679 A | * | 8/1998 | Hawker et al. ................ 381/163 |

(Continued)

FOREIGN PATENT DOCUMENTS

| | | |
|---|---|---|
| JP | 58-121488 U | 8/1983 |
| JP | 04-154298 | 5/1992 |

(Continued)

OTHER PUBLICATIONS

International Search Report of PCT Application No. PCT/JP2012/002797 dated Jun. 12, 2012.

*Primary Examiner* — Matthew Eason
*Assistant Examiner* — Sean H Nguyen
(74) *Attorney, Agent, or Firm* — Panasonic Patent Center

(57) ABSTRACT

A loudspeaker system includes an enclosure surrounding a plurality of loudspeakers. The plurality of loudspeakers are disposed in series along a straight line in the enclosure. The enclosure includes a front panel, a back panel and side panels. The front panel, the side panels, and the back panel are disposed parallel to the straight line on which the loudspeakers are arranged. The side panels are provided with a front slit and a back slit. The back slit is disposed at an opposite side of the front slit in the enclosure. Sounds emitted to the upper and lower sides of diaphragms of the loudspeakers are separated from each other such that the sounds are prevented from mixing with each other. This provides a loudspeaker system capable of achieving desired sound pressure-frequency characteristics.

23 Claims, 6 Drawing Sheets

(56) References Cited

U.S. PATENT DOCUMENTS

| | | | |
|---|---|---|---|
| 6,332,029 B1 * | 12/2001 | Azima et al. | 381/152 |
| 6,339,649 B1 * | 1/2002 | Chen et al. | 381/335 |
| 7,567,680 B2 * | 7/2009 | Murray et al. | 381/181 |
| 7,983,436 B2 * | 7/2011 | Nichols et al. | 381/335 |
| 8,256,566 B1 * | 9/2012 | Rodgers | 181/156 |
| 8,396,240 B2 * | 3/2013 | Rosen | 381/335 |
| 2002/0191808 A1 * | 12/2002 | Croft et al. | 381/431 |
| 2004/0136558 A1 * | 7/2004 | Usuki et al. | 381/394 |
| 2006/0034479 A1 * | 2/2006 | Oshika et al. | 381/386 |
| 2007/0127767 A1 * | 6/2007 | Croft et al. | 381/422 |
| 2009/0154735 A1 * | 6/2009 | Kim et al. | 381/190 |
| 2009/0291718 A1 * | 11/2009 | Fukazawa | 455/575.1 |
| 2011/0235845 A1 * | 9/2011 | Wang | 381/386 |
| 2012/0263338 A1 * | 10/2012 | Hori et al. | 381/398 |

FOREIGN PATENT DOCUMENTS

| | | |
|---|---|---|
| JP | 08-251686 | 9/1996 |
| JP | 2001-189981 | 7/2001 |
| JP | 2005-079809 | 3/2005 |
| JP | 2005-109949 | 4/2005 |
| JP | 2007-235709 | 9/2007 |

* cited by examiner

SPEAKER SYSTEM, ELECTRONIC APPARATUS USING SAME, AND MOBILE BODY DEVICE

CROSS-REFERENCE TO RELATED APPLICATIONS

The present application is a continuation application of international application PCT/JP2012/002792 filed on Apr. 24, 2012, which claims the benefit of foreign priority of Japanese patent application no. 2011-110938 filed on May 18, 2011, the contents both of which are incorporated herein by reference.

TECHNICAL FIELD

The technical field relates to a loudspeaker system used for various types of video and audio equipment, mobile devices, and the like.

BACKGROUND ART

Hereinafter, a conventional loudspeaker system is described with reference to a drawing. FIG. 10 is a sectional view of a conventional loudspeaker system.

Conventional loudspeaker system 37 includes enclosure 34 and electrodynamic cone loudspeaker 35. Loudspeakers 35 are housed inside enclosure 34. Cone loudspeaker 35 includes magnetic circuit 44, frame 46, diaphragm 47, voice coil 48, damper 49, and dust cap 50. Magnetic circuit 44 includes magnet 41, plate 42, and yoke 43. Enclosure 34 includes front part 31 and back part 32. A front-side tip end of frame 46 of cone loudspeaker 35 is fixed to front part 31 of enclosure 34. With this configuration, enclosure 34 is in a sealed state.

Magnetic circuit 44 is fixed in the rear part of frame 46. Diaphragm 47 is connected to the tip end of frame 46 via edge 47a. Diaphragm 47 is provided with voice coil 48 in the middle part thereof. Voice coil 48 is disposed in magnetic gap 45 of magnetic circuit 44.

SUMMARY

A loudspeaker system according to embodiments includes a plurality of loudspeakers and an enclosure surrounding the plurality of loudspeakers. In the enclosure, the plurality of loudspeakers are arranged in series in a straight line. The enclosure includes a front panel, side panels, and a back panel. The front panel, the side panels, and the back panel are disposed parallel to the straight line on which the loudspeakers are arranged. The front panel is disposed facing the diaphragms above the diaphragms of the loudspeakers. On the other hand, the back panel is disposed facing the front panel below the diaphragms of the loudspeakers. The side panels bond the front panel and the back panel to each other. Moreover, the side panels have a front slit and a back slit. The front slit is linked to a space in the upper side of the diaphragms in the enclosure. On the other hand, from the back slit, a sound emitted to the lower side of the diaphragms is emitted to the outside of the enclosure.

The back slit is disposed at an opposite side to the front slit in the enclosure.

With the above-mentioned configuration, it is possible to suppress mixing of a sound emitted to the upper side of the diaphragms of the loudspeakers and a sound emitted to the lower side of the diaphragms of the loudspeakers. Therefore, attenuating or offset of the sound emitted from the front slit by the sound emitted from the back slit can be suppressed. As a result, it is possible to achieve a loudspeaker system capable of suppressing deterioration of sound pressure-frequency characteristics.

DETAILED DESCRIPTION

First Exemplary Embodiment

Figure 1:
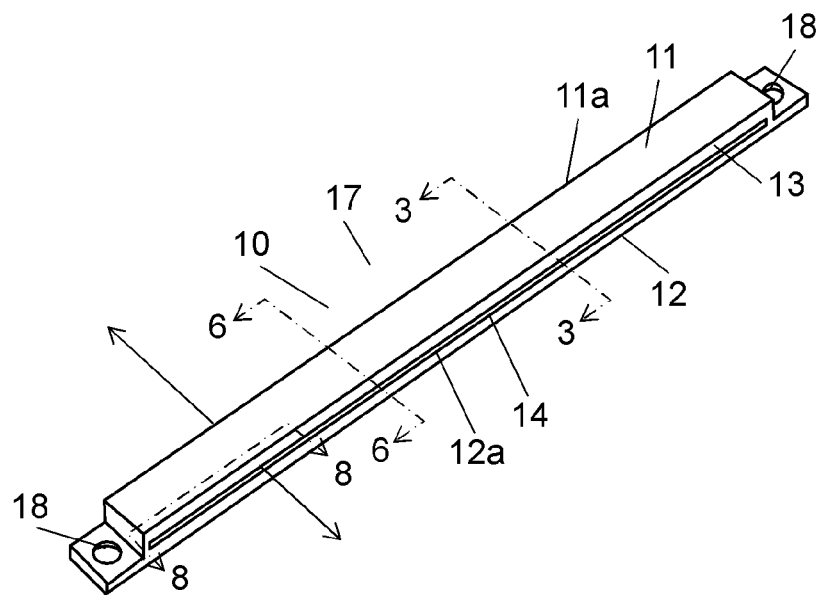
FIG. 1 is a perspective view of a loudspeaker system according to a first exemplary embodiment.
Figure 2:
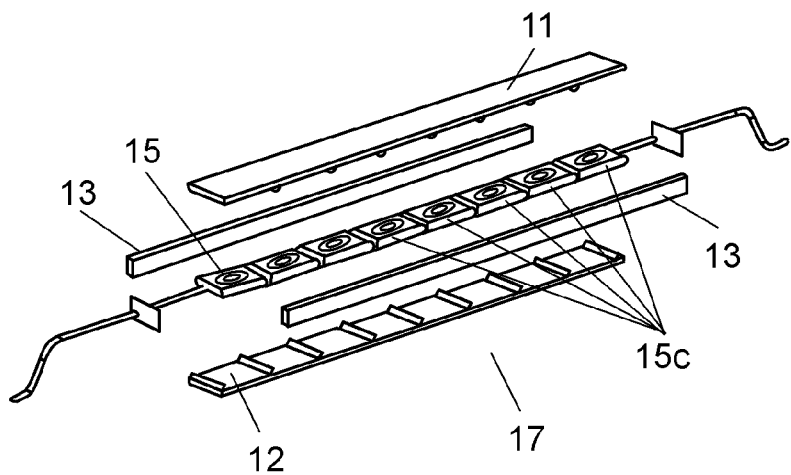
FIG. 2 is an exploded perspective view of the loudspeaker system according to the first exemplary embodiment.
Figure 3:
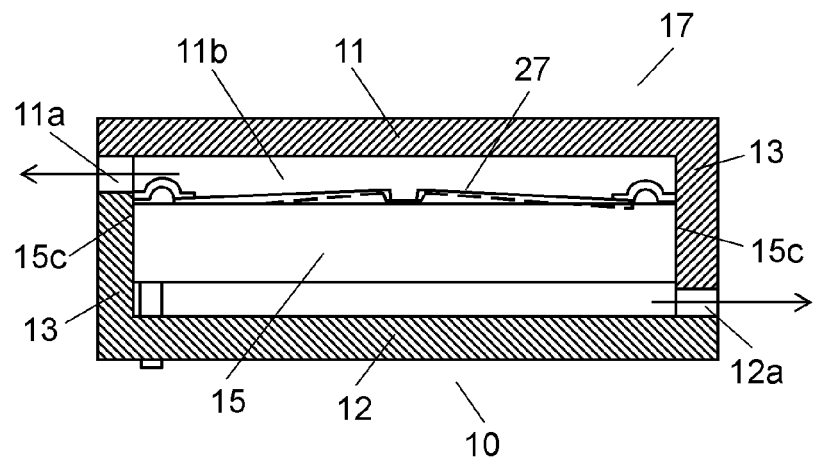
FIG. 3 is a sectional view of the loudspeaker system according to the first exemplary embodiment.

FIG. 1 is a perspective view of a loudspeaker system according to the first exemplary embodiment. FIG. 2 is an exploded perspective view of the loudspeaker system according to the first exemplary embodiment. FIG. 3 is a sectional view of the loudspeaker system according to the first exemplary embodiment. FIG. 3 is a view showing a state taken on cross-sectional line 3-3 in FIG. 1.

Loudspeaker system 17 of the first exemplary embodiment includes loudspeakers 15 and enclosure 10. Loudspeakers 15 are disposed in series along a straight line (aligned) in enclosure 10. Loudspeakers 15 are surrounded by enclosure 10.

Enclosure 10 includes front panel 11, back panel 12 and side panels 13. Each of front panel 11, back panel 12, and side panels 13 is disposed parallel to the straight line on which loudspeakers 15 are arranged. Front panel 11 is disposed facing diaphragms 27 above diaphragms 27 of loudspeakers 15. With this configuration, in enclosure 10, upper-side space 11b is formed above diaphragms 27. On the other hand, back panel 12 is disposed facing front panel 11 below diaphragms 27 of loudspeakers 15. With this configuration, a space in enclosure 10 is divided into upper and lower parts by diaphragms 27 as a boundary. As a result, the inside of loudspeaker system 17 is divided such that sounds emitted in respective directions are not mixed with each other.

Side panels 13 bond front panel 11 and back panel 12 to each other. Side panels 13 are provided with front slit 11a and/or back slit 12a. Front slit 11a is communicated with upper-side space 11b in enclosure 10. As a result, a sound emitted to the upper side of diaphragms 27 is emitted to the outside of enclosure 10 via front slit 11a. On the other hand, a sound emitted to the lower side of diaphragms 27 is emitted to the outside of enclosure 10 via back slit 12a.

The sound emitted to the lower side of diaphragms 27 includes a sound having an inversed phase to that of the sound emitted to the outside from front slit 11a. Thus, back slit 12a is disposed in a position opposite side to front slit 11a in enclosure 10. That is to say, front slit 11a and back slit 12a are disposed such that the sound emitted to the upper side of diaphragms 27 and the sound emitted to the lower side of diaphragms 27 are emitted in the opposite directions from each other. Therefore, loudspeaker system 17 of the present embodiment emits sounds in directions shown as arrows in FIGS. 1 and 3. As a result, the sound emitted from diaphragms 27 to upper-side space 11b and the sound emitted to the lower side of diaphragms are separated from each other, so that mixing of the sounds can be suppressed.

Therefore, attenuation or offset of the sound emitted from front slit 11a to the outside by the sound emitted to the lower side of diaphragms 27 is suppressed. With the above-mentioned configuration, loudspeaker system 17 having desired sound pressure-frequency characteristics can be achieved.

Figure 10:
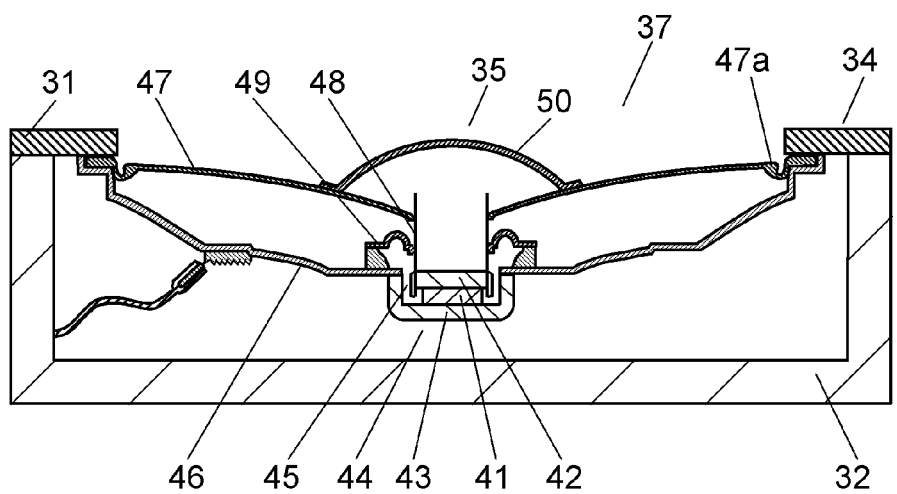
FIG. 10 is a sectional view of a conventional loudspeaker system.

A conventional loudspeaker system 37 as shown in FIG. 10 is accommodated in an outer frame of an electronic apparatus represented by, for example, a liquid crystal television, and it is disposed such that front part 31 of enclosure 34 faces to the front surface of the electronic apparatus. In electronic apparatuses in recent years, an outer frame is extremely thin, and narrow in width. Since loudspeaker system 37 is accommodated in such an outer frame, a shape of conventional loudspeaker system 37 or a shape of conventional cone loudspeaker 35 is required to be narrow in width and longer in the longitudinal direction than in the lateral direction to have a slim shape. In general, examples of the shape include a racetrack shape, and ellipse.

However, conventional cone loudspeaker 35 is an electrodynamic cone loudspeaker. Moreover, since the conventional cone loudspeaker 35 needs a large input resistance level, cone loudspeaker 35 is thick. Furthermore, from the viewpoint of flattening of the sound pressure-frequency characteristics of diaphragm 47, a ratio of a dimension in the longitudinal direction (vertical) with respect to a dimension in the lateral direction (horizontal) of the outer shape of diaphragm 47 (hereinafter, referred to as an "aspect ratio") cannot be increased. As a result, the aspect ratio of the outer shape of loudspeaker system 37 or cone loudspeaker 35 is generally 4 or less. Even when the sound pressure-frequency characteristics of diaphragm 47 are sacrificed, the aspect ratio of loudspeaker system 37 or cone loudspeaker 35 is about 5 at maximum.

Accordingly, reducing the size and thickness of a conventional loudspeaker system 37 is a problem. That is to say, a problem associated with conventional cone loudspeaker 35 is that overall height of diaphragm 47 is large. Furthermore, diaphragm 47 has a problem that the aspect ratio of diaphragm 47 cannot be increased for obtaining flattening of the sound pressure-frequency characteristics.

On the contrary, this exemplary embodiment can solve the above-mentioned problems, and provide loudspeaker system 17 capable of achieving desired sound pressure-frequency characteristics although it has small size and thickness.

That is to say, loudspeakers 15 in this exemplary embodiment shown in FIGS. 2 and 3 have following advantageous points with respect to conventional cone loudspeaker 35 shown in FIG. 10. That is to say, it has small width in the lateral direction and small length in the vertical direction as compared with conventional cone loudspeaker 35, and also it has small thickness. Furthermore, each of diaphragms 27 of loudspeakers 15 is smaller as compared with diaphragm 47 of conventional cone loudspeaker 35.

However, sound pressure-frequency characteristics and input resistance of each of loudspeakers 15 are lower than those of conventional cone loudspeaker 35. Thus, in order to achieve desired sound pressure-frequency characteristics by using loudspeakers 15 having low sound pressure-frequency characteristics and input resistance, loudspeaker system 17 includes a plurality of loudspeakers 15 in enclosure 10 as shown in FIG. 2. Furthermore, as shown in FIG. 3, back slit 12a is disposed at a position opposite side to front slit 11a in enclosure 10.

With such a configuration, loudspeaker system 17 emits the sound emitted to the upper side of loudspeakers 15 and the sound emitted to the lower side of loudspeakers 15 in the opposite directions to each other. As a result, in loudspeaker system 17 in this exemplary embodiment, the sound emitted to the upper side of loudspeakers 15 and the sound emitted to the lower side of loudspeakers 15 are separated from each other, and sound pressure-frequency characteristics that are the same level as those of conventional cone loudspeaker 35.

Furthermore, loudspeaker system 17 has a configuration in which loudspeakers 15 are not exposed. Therefore, it is possible to reduce load applied to diaphragms 27 during delivery or assembly to electronic apparatus 61 (shown in FIG. 4 or FIG. 5). As a result, from the view point of distribution, it can be handled easily. Furthermore, during build-in operation to electronic apparatus 61 or the like, loudspeaker system 17 having excellent workability can be achieved.

Figure 4:
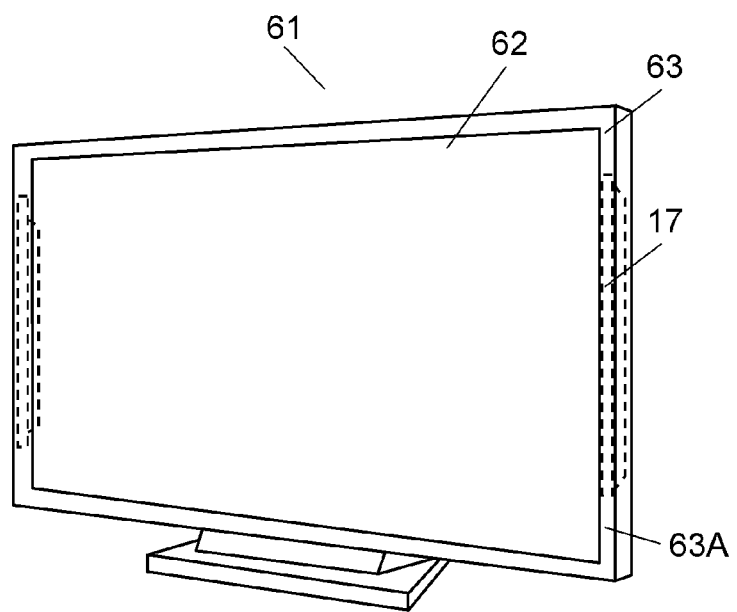
FIG. 4 is an external view of an electronic apparatus according to the first exemplary embodiment.

Hereinafter, an electronic apparatus using loudspeaker system 17 in this exemplary embodiment is described. FIG. 4 is an external view of electronic apparatus 61 according to the first exemplary embodiment. Herein, description is made with relatively low-inch video equipment as an example of electronic apparatus 61.

Electronic apparatus 61 of this exemplary embodiment includes cabinet 63, display module 62, and loudspeaker systems 17. Display module 62 and loudspeaker systems 17 are housed in cabinet 63. With this configuration, when electronic apparatus 61 is seen from the front surface, display module 62 is disposed in the middle part at a front surface side of cabinet 63, outer frame 63A of cabinet 63 is disposed such that it surrounds display module 62. In this exemplary embodiment, loudspeaker systems 17 are disposed in left and right parts of outer frame 63A. Since loudspeaker system 17 is disposed in this way, electronic apparatus 61 permits stereo reproduction.

Loudspeaker system 17 has a long and narrow shape. Thus, loudspeaker system 17 is disposed such that the longitudinal direction of loudspeaker system 17 is a vertical direction of electronic apparatus 61. Furthermore, loudspeaker system 17 is mounted such that front slit 11a (shown in FIG. 3) from which a sound is emitted faces the front surface side of electronic apparatus 61.

With such a configuration, the width of outer frame 63A of electronic apparatus 61 can be narrowed. Loudspeaker system 17 may be disposed in electronic apparatus 61 in such a direction in which a front slit 11a (shown in FIG. 3) side is a side-surface side of electronic apparatus 61. In this case, a thickness of outer frame 63A of electronic apparatus 61 can be reduced.

Figure 5:
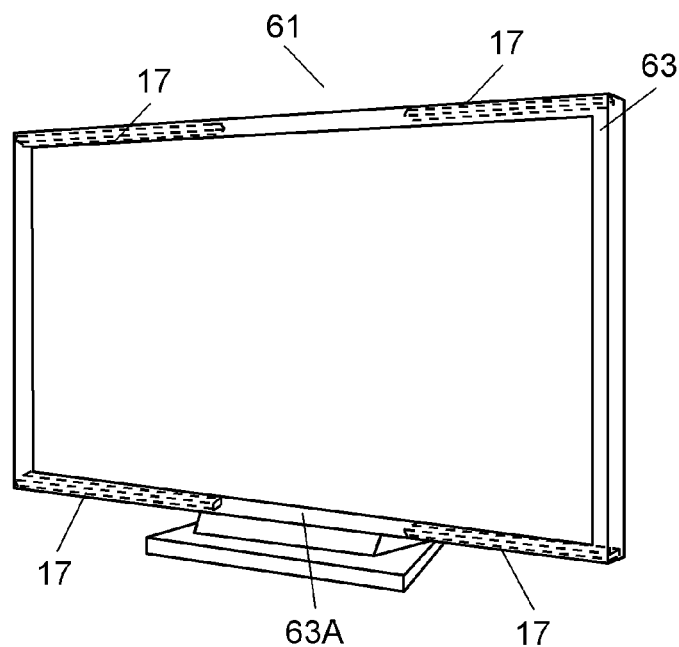
FIG. 5 is an external view of an electronic apparatus as a second example according to the first exemplary embodiment.

FIG. 5 is an external view of electronic apparatus 61 as a second example according to the first exemplary embodiment. Herein, description is made with relatively large-inch video equipment used as an example of electronic apparatus 61. In electronic apparatus 61 of this example, loudspeaker systems 17 are disposed in upper and lower parts of outer frame 63A in cabinet 63 of electronic apparatus 61. Herein, four loudspeaker systems 17 are mounted for stereo reproduction. Thus, electronic apparatus 61 permits stereo reproduction. In this example, loudspeaker systems 17 are disposed in the upper and lower parts of outer frame 63A, but they may be disposed in any one of the upper and lower parts. Furthermore, when at least two loudspeaker systems 17 are housed in electronic apparatus 61, stereo reproduction is possible.

In this case, each of loudspeaker systems 17 are disposed with its longitudinal direction of loudspeaker systems 17 along the lateral direction of electronic apparatus 61. Furthermore, loudspeaker systems 17 are mounted with the front slit 11a side shown in FIG. 3 facing a front surface side of electronic apparatus 61. With such a configuration, the width of outer frame 63A can be made to be narrow. Loudspeaker systems 17 may be disposed with front slit 11a facing the upper side or the lower side of electronic apparatus 61. In this case, the thickness of outer frame 63A can be reduced.

Furthermore, if necessary, loudspeaker systems 17 may be disposed both in the left and right and upper and lower parts of the outer frame of display module 62. With this configuration, even if each of loudspeaker systems 17 has small input resistance, the sound pressure-frequency characteristics of electronic apparatus 61 can be increased.

Cabinets 63 of electronic apparatuses 61 of the first and second examples shown in FIG. 4 and FIG. 5 are not completely sealed for heat dissipation and have air permeability. However, as shown in FIG. 3, back slit 12a is disposed at a position opposite to front slit 11a in enclosure 10. Therefore, in loudspeaker system 17, a sound emitted from front slit 11a and a sound emitted from back slit 12a are emitted in the opposite directions to each other. That is to say, the sound emitted from back slit 12a is taken into the inside of electronic apparatus 61 and attenuated. Therefore, even if the inside of electronic apparatuses 61 of the first and second examples have air permeability, the sound emitted from back slit 12a and the sound emitted from front slit 11a are not easily mixed with each other.

In electronic apparatuses 61 shown in FIG. 4 or FIG. 5, loudspeaker systems 17 are accommodated in such a manner that no space is present between side panel 13 at the front slit 11a side shown in FIG. 3 and the inner surface of cabinet 63. Cloth or cushion material may be disposed between side panel 13 at the front slit 11a side and the inner surface of cabinet 63, so that no space is present between side panel 13 at the front slit 11a side and the inner surface of cabinet 63.

This configuration can suppress leakage of the sound emitted from front slit 11a to the inside of electronic apparatus 61. Therefore, the sound emitted from back slit 12a and the sound emitted from front slit 11a are hardly mixed with each other.

Herein, a frequency band at which loudspeaker system 17 can reproduce sounds is mainly in the middle- and high-frequency band. In electronic apparatus 61, when reproduction of a low-frequency sound is necessary, a loudspeaker system dedicated to reproduction of low-frequency bands is provided separately. With this configuration, electronic apparatus 61 capable of reproducing all frequency bands can be achieved.

The directionality of a loudspeaker system dedicated to the reproduction of low-frequency bands is extremely wide. Therefore, the loudspeaker system dedicated to the reproduction of low-frequency bands is not required to be provided in the front part of video equipment as in a loudspeaker system dedicated to the reproduction of middle- and high-frequency bands. As a result, the loudspeaker system dedicated to the reproduction of low-frequency bands can be mounted in an empty space inside electronic apparatus 61. Therefore, the loudspeaker system dedicated to the reproduction of low-frequency bands does not prevent reduction in size of electronic apparatus 61.

Figure 6:
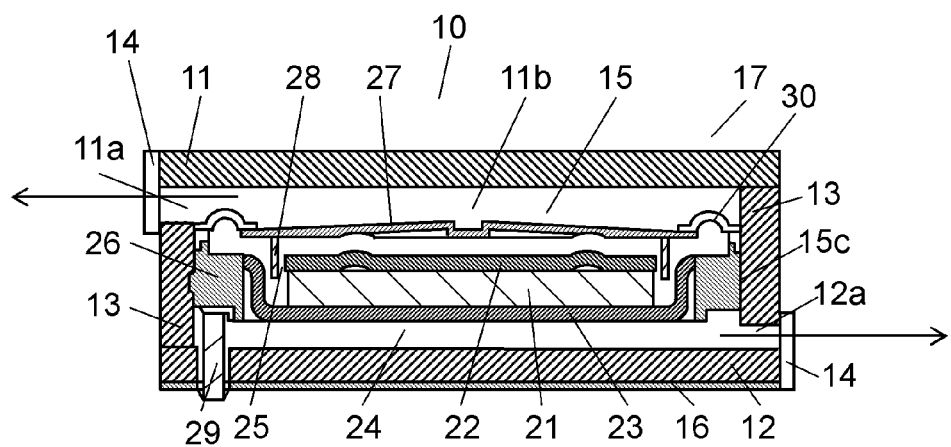
FIG. 6 is a sectional view of the loudspeaker system according to the first exemplary embodiment.

Next, loudspeakers 15 in this exemplary embodiment are described in detail. FIG. 6 is a sectional view of the loudspeaker system according to this exemplary embodiment. FIG. 6 is a sectional view showing a state of loudspeaker system 17 taken on line 6-6 of FIG. 1.

As shown in FIG. 6, magnetic circuit 24 of each of loudspeakers 15 in this example is configured by sandwiching magnetized magnet 21 between upper plate 22 and yoke 23. Frame 26 made of resin is bonded to magnetic circuit 24. Flat-shaped or dome-shaped diaphragm 27 is adhesively bonded to a circumference of frame 26. Diaphragm 27 is supported by the circumference of frame 26 via edge 30. In the vicinity of the outer periphery of diaphragms 27, voice coil 28 for driving diaphragm 27 is bonded. Voice coil 28 is configured in such a manner that it is disposed in magnetic gap 25 of magnetic circuit 24.

Loudspeaker 15 does not have damper 49 like cone loudspeaker 35 shown in FIG. 10. Therefore, an overall height (thickness) of loudspeaker 15 can be reduced as compared with conventional cone loudspeaker 35. Furthermore, diaphragm 27 is not cone-shaped as in conventional cone loudspeaker 35 shown in FIG. 10 but is a flat-shaped or dome-shaped diaphragm. Therefore, the overall height (thickness) of loudspeaker 15 can be further reduced as compared with conventional cone loudspeaker 35. As a result, loudspeaker system 17 having a smaller overall height (thickness).

Voice coil 28 is made to have as large a size as possible and is joined to a place near the outer circumference of diaphragm 27. This configuration provides favorable heat dissipation properties of voice coil 28. Therefore, it is possible to obtain loudspeaker system 17 having desired input resistance.

Furthermore, the phase in the amplitude at both longitudinal ends of diaphragm 27 can be made equal to the phase in the amplitude of voice coil 28 because voice coil 28 is bonded to a vicinity of the outer circumference of diaphragm 27. This decreases distortion of loudspeakers 15, thereby providing loudspeakers 15 with stable sound pressure-frequency characteristics to be achieved.

Edge 30 is formed of a highly flexible material that is different from that of diaphragm 27. Furthermore, edge 30 and diaphragm 27 are unitarily molded by insert molding. This configuration can provide loudspeaker 15 having high input resistance and being capable of achieving wide frequency band reproduction so as to enlarge a low band.

Furthermore, loudspeakers 15 are usually used for portable phones and the like, and generally called small micro-loudspeakers. Loudspeakers 15 are manufactured for application of portable phones in a very large quantity in a dedicated, automated, mass production facility. As a result, by the effect of mass production, a price per piece is extremely low as compared with conventional cone loudspeaker 35. Therefore, this prevents the price of loudspeaker system 17 from increasing even if a large number of loudspeakers 15 are used.

The shape of each of loudspeakers 15 may be other than a rectangle. Examples of the outer shape of loudspeaker 15 include a racetrack shape and an ellipse. At present, with the tendency toward the size reduction or forming into a compact of information communication terminals such as portable phones, the mainstream shape is becoming a rectangular, a racetrack shape, or an ellipse. Therefore, loudspeakers 15 of this shape can be provided at a low cost.

Hereinbefore, description is made of a case in which an electrodynamic speaker is used as loudspeakers as a type of loudspeakers 15 to be used for loudspeaker system 17. However, loudspeakers 15 are not limited to this type, and any types of loudspeakers may be used, but preferably they are a piezoelectric or electrostatic, small and thin loudspeakers. Then, when such loudspeakers 15 are used, the same effect as that of loudspeakers 15 in this example.

Next, loudspeaker system 17 in this exemplary embodiment is described in detail with reference to FIG. 6. Loudspeaker system 17 includes loudspeakers 15 and enclosure 10. Enclosure 10 includes front panel 11, back panel 12, and side panels 13. As shown in FIG. 2, in enclosure 10, loudspeakers 15 are disposed in series along a straight line (aligned). Front panel 11, back panel 12, and side panels 13 are disposed parallel to straight line on which loudspeakers 15 are arranged. Each of loudspeakers 15 is housed in a center part of enclosure 10 as shown in FIG. 6.

Each of loudspeakers 15 has a smaller size and a lower overall height as compared with conventional cone loudspeaker 35 shown in FIG. 10. Furthermore, each of loudspeakers 15 has smaller sound pressure-frequency characteristics as compared with conventional cone loudspeaker 35. Therefore, in loudspeaker system 17 of this example, necessary input resistance and sound pressure-frequency characteristics are obtained by using a large number of (for example, eight) such loudspeakers 15. Loudspeakers 15 of this exemplary embodiment are not expensive as mentioned above. Therefore, even if a large number of loudspeakers 15 are used, it is possible to provide low-cost loudspeaker system 17.

As shown in FIG. 2, the outer shape of loudspeaker 15 is rectangular. Furthermore, loudspeakers 15 are disposed in series along the longitudinal direction of each loudspeaker 15. This configuration can provide loudspeaker system 17 having a narrow width. Furthermore, since loudspeakers 15 are quadrangular, loudspeakers 15 can be disposed with respect to back panel 12 efficiently. Therefore, the size of loudspeaker system 17 can be reduced.

In loudspeaker system 17 of this example, eight loudspeakers 15 are disposed along a straight line in enclosure 10. In this case, the outer dimension is about 180 mm including attaching part 18 to a set in the longitudinal direction (vertical direction) of loudspeaker system 17 shown in FIG. 1. On the other hand, the outer dimension in the lateral direction (horizontal direction) of loudspeaker system 17 is about 12 mm. The outer dimension (overall height) of loudspeaker system 17 in the thickness direction is about 8 mm. Therefore, the dimension of loudspeaker system 17 is shortest in the thickness direction. Thus, loudspeaker system 17 is disposed in the direction in which one of side panels 13 (thickness direction) faces the front side of electronic apparatus 61 (shown in FIGS. 4 and 5). This configuration can further reduce the size of electronic apparatus 61.

As shown in FIG. 2, in loudspeaker system 17 in this example, eight loudspeakers 15 are housed in enclosure 10. However, the number of loudspeakers 15 housed in enclosure 10 is not necessarily limited to this, but it can be freely set to, for example, 2, 4, 6, 10, 12, 14, 16, 20, and 30. In general, in normal standard (for example, JIS standard) with respect to loudspeaker system 17, an impedance value of loudspeaker system 17 is an even number. Thus, when even number of loudspeakers 15 are appropriately connected in parallel or serially, loudspeaker system 17 having a specified value of impedance can be obtained. However, the number of minimum unit of loudspeakers 15 housed in enclosure 10 is 2.

That is to say, the quantity of loudspeakers 15 of loudspeaker system 17 is appropriately determined depending upon an allowable dimension of an apparatus on which loudspeaker systems 17 are mounted, the input resistance required for loudspeaker system 17, and sound pressure-frequency characteristics.

Next, a method of manufacturing loudspeaker system 17 of this example is described. In this example, front panel 11, back panel 12, and side panels 13 are previously manufactured separately. In loudspeaker system 17 of this example, front panel 11 and side panels 13 are assembled preliminarily. Then, eight loudspeakers 15 are mounted to an assembled product of front panel 11 and side panels 13. Thereafter, back panel 12 is placed onto the assembled product of front panel 11 and side panels 13 to which eight loudspeakers 15 are mounted, thus loudspeaker system 17 is completed.

As shown in FIG. 6, in enclosure 10, the outer dimension in the minor axis direction of a frame of each loudspeaker 15 is made to be substantially the same as the inner dimension between two side panels 13. In other words, the outer dimension in the lateral direction of the enclosure 10 is a dimension or more than the dimension of the dimension in the lateral direction of each loudspeaker 15 plus the thicknesses of side panels 13. As a result, when loudspeakers 15 are fitted between two side panels 13, backlash between loudspeakers 15 and side panel 13 can be reduced.

Therefore, since the position accuracy of loudspeakers 15 can be enhanced, and the positioning thereof can be facilitated, the work efficiency at which loudspeakers 15 are attached to enclosure 10 can be improved. As a result, the price of loudspeaker system 17 can be reduced. Furthermore, since a space between loudspeakers 15 and side panels 13 can be reduced, a sound emitted to the upper side of diaphragms 27 and a sound emitted to the lower side of diaphragms 27 are separated from each other.

Front panel 11 and two side panels 13 may be unitarily formed by using the same material. In this way, a manufacturing cost of enclosure 10 can be reduced. Furthermore, since front panel 11 and side panels 13 are unitarily formed with each other, dimension accuracy between two side panels 13 can be enhanced. Therefore, when two side panels 13 are used as a guide of loudspeakers 15, positioning of loudspeakers 15 can be carried out more easily. As a result, loudspeakers 15 can be easily incorporated into enclosure 10. Therefore, an assembly cost of loudspeaker system 17 can be reduced.

Furthermore, since front panel 11 and two side panels 13 are unitarily formed, unusual noise is prevented from being generated when front panel 11 and two side panels 13 are brought into contact with each other. Moreover, air does not leak at joints between back panel 11 and side panels 13, and leakage of a sound to the outside of enclosure 10 is suppressed. Therefore, the sound emitted to the upper side of diaphragms 27 and the sound emitted to the lower side of diaphragms 27 are further separated from each other. In addition to this, front panel 11 and side panels 13 are not detached from each other in the attaching part thereof. Furthermore, the strength of enclosure 10 can be enhanced.

Alternatively, two side panels 13 and rear panel 12 may be unitarily formed by using the same material. Or, one of side panels 13 and front panel 11 may be unitarily formed by using the same material. In this case, the other of side panels 13 is unitarily formed by using the same material as that of back panel 12. Alternatively, all the parts of enclosure 10 excluding one plate may be unitarily formed by using the same material. In this case, after loudspeakers 15 are inserted into all the parts of enclosure 10 excluding one plate, the last plate is bounded. These configurations reduce a manufacturing cost of enclosure 10. Furthermore, as compared with the case where side panels 13 are assembled individually, dimension accuracy between two side panels 13 can be enhanced, which can reduce the assembling cost of loudspeaker system 17.

In FIG. 6, wiring unit 16 of this example is printed wirings provided on back panel 12. That is to say, loudspeakers 15 are mounted on back panel 12, so that loudspeakers 15 are coupled to each other. Conventional cone loudspeaker 35 shown in FIG. 10 is wired by point-to-point wiring by a loudspeaker cord. However, since loudspeaker system 17 according to this exemplary embodiment is wired by the printed wirings, a loudspeaker cord is not necessary. As a result, a thickness of loudspeaker system 17 can be reduced by a thickness of the loudspeaker cord. Therefore, in loudspeaker system 17, loudspeakers 15 can be connected to each other with a small thickness. Furthermore, since loudspeaker system 17 does not require works for connecting the loudspeaker cord, excellent productivity is achieved. Furthermore, this configuration prevents unusual noise caused by a touch of the loudspeaker cord with other components.

Furthermore, when back panel 12 is formed by a printed circuit board, back panel 12 is not required to be additionally prepared. In this case, loudspeaker system 17 can be further improved in productivity and can be provided at a lower cost. Furthermore, back panel 12 can be easily manufactured by mass production facility (process) of the printed wiring board. Therefore, back panel 12 is available at an extremely low cost and easily.

Terminal 29 is provided to the lower side of each loudspeaker 15. Terminal 29 connects each loudspeaker 15 to wiring unit 16. As terminal 29, for example, a pin-shaped terminal or a spring-shaped terminal is used. When terminal 29 is a pin-shaped terminal, terminal 29 is connected to wiring unit 16e by, for example, solder.

On the other hand, when terminal 29 is a spring-shaped terminal, wiring unit 16 is formed on the upper surface of back panel 12. Then, terminal 29 is urged to wiring unit 16 by an elastic force of terminal 29. In this case, the lower surface of loudspeakers 15 and back panel 12 are adhesively bonded to each other with an adhesive agent, a double-side tape, a gluing agent, or the like.

In conventional loudspeaker system 37 shown in FIG. 10, cone loudspeaker 35 is fixed to enclosure 34 with attaching screws. However, in terminal 29 of any examples in this exemplary embodiment, attaching screws for fixing loudspeakers 15 to back panel 12 are not required. Therefore, since a process for tightening screws is not necessary, man-hours can be reduced. As a result, it is possible to obtain loudspeaker system 17, which permits significant cost reduction.

When the spring-shaped terminal is used for terminal 29, since back panel 12 is fixed in a state in which it is pressed with an elastic force of the spring-shaped terminal, unnecessary resonance of back panel 12 can be suppressed. Therefore, acoustically stable loudspeaker system 17 can be achieved.

A cross-section of enclosure 10 is quadrangular as shown in FIG. 6. Front panel 11 is disposed so as to face back panel 12. Two side panels 13 are disposed perpendicular to front panel 11 and back panel 12. As a result, a sound emitted for front slit 11a is emitted in a direction substantially parallel to front panel 11. On the other hand, a sound emitted from back slit 12a is emitted in a direction substantially parallel to back panel 12.

Back slit 12a is disposed in a position at opposite side to the front slit 11a in enclosure 10. Front slit 11a is communicated with upper-side space 11b at the upper end of side panel 13. On the other hand, back slit 12a is provided at the lower edge of side panel 13. With the configurations, a sound emitted to front panel 11 side of diaphragms 27 and a sound emitted to back panel 12 side of diaphragms 27 are emitted from positions that are most distant from each other in enclosure 10. Furthermore, a sound emitted to the upper side of diaphragms 27 and a sound emitted to the lower side of diaphragms 27 are emitted to the opposite directions to each other.

With this configuration, mixing of the sound emitted to the front panel 11 side of diaphragms 27 and the sound emitted to the back panel 12 side of diaphragms 27 can be suppressed. Therefore, it is possible to achieve a slim, small, and thin loudspeaker system 17 by using loudspeakers 15.

When conventional loudspeaker system 37 shown in FIG. 10 is configured in such a manner that a direction in which a sound from enclosure 34 is emitted is perpendicular to the amplitude direction of diaphragm 47, the sound quality is deteriorated by a front chamber effect. This is generated by diffraction or phase difference of the sound emitted from diaphragm 47.

However, as shown in FIG. 6, diaphragms 27 of this example have a flat shape. Therefore, upper-side space 11b and front slit 11a have simple shapes. Therefore, a front chamber effect of the sound emitted from diaphragms 27 to the upper side can suppressed. As a result, loudspeaker system 17 having an excellent sound quality and sound pressure-frequency characteristics can be obtained.

Since enclosure 10 of loudspeaker system 17 has a small volume, the sound emitted to the upper side of diaphragms 27 and the sound emitted to the lower side of diaphragms 27 are easily mixed with each other. Then, loudspeakers 15 of this example have a rectangular outer shape as shown in FIG. 2. Moreover, such loudspeakers 15 are disposed side by side and are aligned (disposed along a straight line). Therefore, lateral side surfaces 15c of loudspeakers 15 are also disposed side by side along a straight line. Then, side panel 13 is close to lateral side surface 15c of loudspeakers 15, and disposed along lateral side surface 15c of loudspeakers 15. Furthermore, adjacent loudspeakers 15 are disposed in such a manner that they are close to each other. With this configuration, a space between loudspeakers 15 and a space between loudspeakers 15 and side panels 13 can be made to be small.

Therefore, the sound emitted to the lower side of diaphragms 27 cannot enter around upper-side space 11b of diaphragms 27. As a result, the sound emitted to the upper side of diaphragms 27 and the sound emitted to the lower side of diaphragms 27 are separated from each other.

By providing an adhesive agent or a sealing agent between lateral side surface 15c and side panels 13 or between adjacent loudspeakers 15, air leakage can be further reduced. This configuration permits separation between the sound emitted to the upper side of diaphragms 27 and the sound emitted to the lower side of diaphragms 27. Therefore, loudspeaker system 17 having excellent sound quality can be obtained. Air leakage can be reduced by bringing lateral side surface 15c and side panel 13 into contact with each other. In this case, since an adhesive agent or a sealing agent is not necessary, inexpensive loudspeaker system 17 can be achieved.

Furthermore, when front slit 11a and back slit 12a are covered with dust-proof net 14, entering of fine dust or dirt into the inside of enclosure 10 can be suppressed. Therefore, generation of abnormal noise due to such dust or the like can be suppressed, and thus loudspeaker system 17 having high quality and reliability can be obtained.

By selecting the aperture ratio of dust-proof net 14, the air permeability can be adjusted. As a result, since acoustic load to loudspeakers 15 can be adjusted, sound quality and sound pressure-frequency characteristics of loudspeaker system 17 can be easily adjusted.

In particular, when the acoustic load is given to a sound emitted to the lower side of diaphragms 27, sound quality can be adjusted finely. Furthermore, it is possible to further suppress the adverse effect that a sound having a reversed phase component from the back surface enters around to the front surface. With the above-mentioned configuration, loudspeaker system 17 having high sound pressure-frequency characteristics and small distortion can be achieved.

Figure 7:
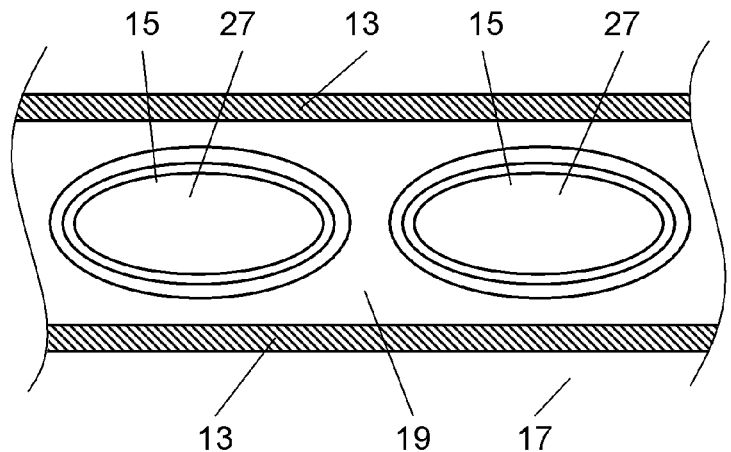
FIG. 7 is a top sectional view of the loudspeaker system of the second example according to the first exemplary embodiment.

FIG. 7 is a top sectional view of a loudspeaker system as a second example according to the first exemplary embodiment. Baffle plate 19 is attached to loudspeakers 15, and blocks space between loudspeakers 15 and side panel 13. Furthermore, baffle plate 19 also blocks a space between adjacent loudspeakers 15. This configuration permits reduction of air leakage easily, thus separating the sound emitted to the upper side of diaphragms 27 (the front direction in FIG. 7) and the sound emitted to the lower side of diaphragms 27 (the rear direction in FIG. 7).

The outer shape of loudspeaker 15 of this example may be any shapes other than a quadrangular shape. Examples of the outer shape of loudspeakers 15 include a racetrack shape and an ellipse. With this configuration, even if loudspeakers 15 each having a racetrack shape or an ellipse shape are used, loudspeaker system 17 having an excellent sound quality can be achieved.

In this case, loudspeakers 15 having a racetrack shape or an ellipse shape and baffle plate 19 are bonded to each other such that no space is formed between loudspeakers 15 and baffle plate 19 and between baffle plate 19 and side panels 13. Also in this case, an adhesive agent or a sealing agent is provided between loudspeakers 15 and baffle plate 19 and between baffle plate 19 and side panels 13. Thus, air leakage can be further reduced, thereby further permitting separation between the sound emitted to the upper side of diaphragms 27 and the sound emitted to the lower side of diaphragms 27. Therefore, loudspeaker system 17 having a further excellent sound quality can be achieved.

Figure 8A:
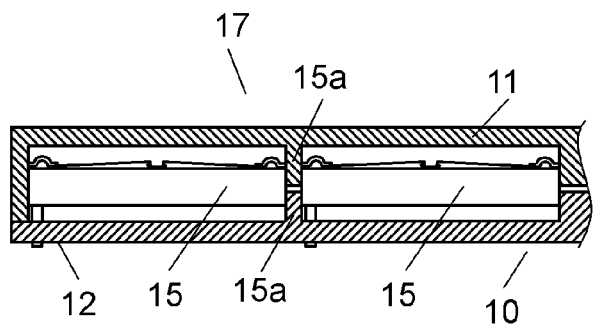
FIG. 8A is a sectional view of an essential part of a loudspeaker system as a third example according to the first exemplary embodiment.

FIG. 8A is a sectional view of an essential part of a loudspeaker system of a third example according to the present exemplary embodiment. FIG. 8A is a sectional view showing a state of loudspeaker system 17 taken along line 8-8 of FIG. 1. In this example, enclosure 10 is provided with partitions 15a for partitioning individual loudspeakers 15. In this example, partition 15a is provided on both front panel 11 and back panel 12.

With this configuration, since sounds emitted from loudspeakers 15 adjacent to each other do not mutually interfere with each other, the sound quality or properties are not adversely affected. Consequently, loudspeaker system 17 capable of achieving excellent sound quality or properties can be obtained.

Figure 8B:
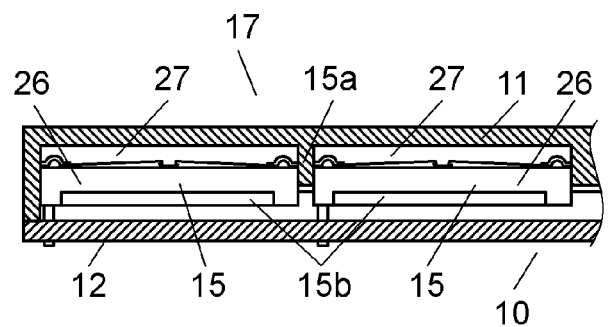
FIG. 8B is a sectional view of an essential part of a loudspeaker system as a fourth example according to the first exemplary embodiment.

FIG. 8B is a sectional view of an essential part of a loudspeaker system as a fourth example according to the first exemplary embodiment. FIG. 8B is a sectional view showing a state taken on sectional line 8-8 of FIG. 1. As shown in FIG. 8B, partition 15a is provided only on front panel 11. In this case, frames 26 of loudspeakers 15 and partition 15a provided on front panel 11 are brought into close contact with each other. Thus, individual loudspeakers 15 can be partitioned completely. With this configuration, back panel 12 does not need partition 15a. Consequently, since back panel 12 can be formed of a general printed wiring board, extremely inexpensive loudspeaker system 17 can be achieved.

In this case, frames 26 are used in place of partition 15a at the back panel 12 side in the loudspeaker system of the fourth example. Therefore, sound emitting holes 15b are provided to the side surface of frames 26. Then, sound emitting holes 15b are disposed such that a sound emitted from sound emitting holes 15b and a sound emitted from front slit 11a are emitted to the opposite directions. That is to say, sound emitting hole 15b is disposed in position corresponding to back slit 12a (shown in FIG. 6). With this configuration, the sound emitted to the lower side of diaphragms 27 is emitted to the outside of enclosure 10 from back slit 12a (shown in FIG. 6) via sound emitting hole 15b. As a result, the sound emitted to the lower side of diaphragms 27 and the sound emitted to the upper side of diaphragms 27 are emitted from enclosure 10 to the opposite directions. Consequently, the sound emitted to the upper side of diaphragms 27 and the sound emitted to the lower side of diaphragms 27 can be separated from each other.

Figure 8C:
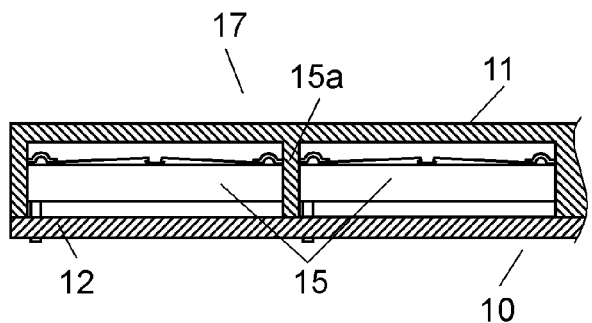
FIG. 8C is a sectional view of an essential part of a loudspeaker system as a fifth example according to the first exemplary embodiment.

FIG. 8C is a sectional view of an essential part of a loudspeaker system as a fifth example according to the first exemplary embodiment. FIG. 8C is a sectional view showing a state taken along sectional line 8-8 of FIG. 1. In enclosure 10 of this example, front panel 11 is provided with partition 15a having an overall height that is not lower than that of loudspeakers 15. Then, loudspeakers 15 are housed in spaces partitioned by partitions 15a. In this case, since back panel 12 is not provided with partitions 15a, a general printed wiring board can be used. Therefore, extremely inexpensive loudspeaker system 17 can be achieved.

Figure 8D:
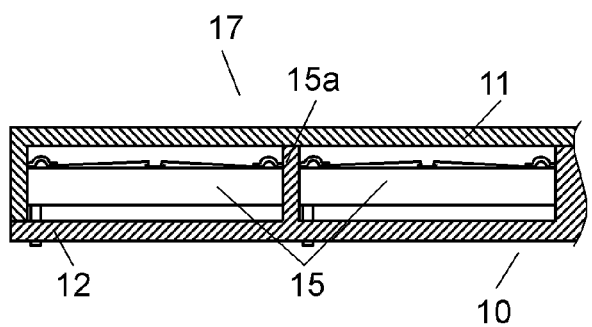
FIG. 8D is a sectional view of an essential part of a loudspeaker system as a sixth example according to the first exemplary embodiment.

FIG. 8D is a sectional view of an essential part of a loudspeaker system as a sixth example according to the first exemplary embodiment. FIG. 8D is a sectional view showing a state taken along sectional line 8-8 of FIG. 1. In loudspeaker system 17 of this example, back panel 12 is provided with partition 15a having an overall height that is not lower than loudspeakers 15. Then, loudspeakers 15 are housed in spaces partitioned by partition 15a.

Figure 8E:
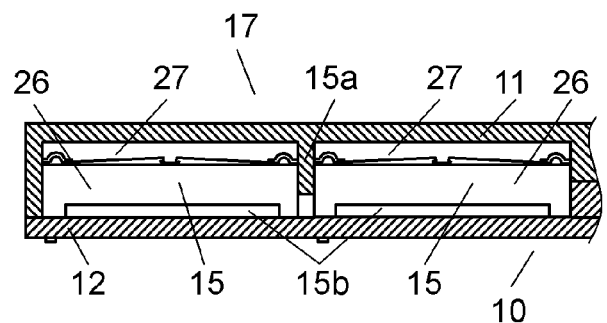
FIG. 8E is a sectional view of an essential part of a loudspeaker system as a seventh example according to the first exemplary embodiment.

FIG. 8E is a sectional view of an essential part of a loudspeaker system as a seventh example according to the first exemplary embodiment. FIG. 8E is a sectional view showing a state taken on sectional line 8-8 of FIG. 1. In loudspeaker system 17 of this example, frame 26 (or yoke 23 shown in FIG. 6) and back panel 12 are brought into close contact with each other and connected together. In this case, sound emitting holes 15b are provided on the side surface parts of frames 26. As a result, the sound emitted to the lower side of diaphragms 27 is emitted to the outside of enclosure 10 from back slit 12a shown in FIG. 6 via sound emitting hole 15b. With the above-mentioned configuration, since no space is present between the lower surface of loudspeakers 15 and the back panel 12, thinner loudspeaker system 17 can be achieved.

In this case, partition 15a may be provided only on front panel 11. That is to say, in this example, at the lower side of diaphragms 27, frames 26 suppress mixing of the sound emitted to the lower side of diaphragms 27 in neighboring loudspeakers 15. In this case, the lower surface of loudspeakers 15 and back panel 12 are brought into close contact with each other. To make them so, the lower surface of loudspeakers 15 and back panel 12 are bounded to each other with an adhesive agent, a double-side tape, a gluing agent, or the like. With this configuration, since back panel 12 is not provided with partitions 15a, a general printed wiring board can be used. Therefore, extremely inexpensive loudspeaker system 17 can be achieved.

As mentioned above, since loudspeaker systems 17 of the third to seventh examples shown in FIGS. 8A to 8E are provided with partition 15a, mixing of the sound emitted to the upper side of diaphragms 27 and the sound emitted to the lower side of diaphragms 27 can be suppressed. Furthermore, mutual interference between the sounds emitted from adjacent loudspeakers 15 can be suppressed.

In loudspeaker systems 17 from the second to the sixth examples, it is desirable that partitions 15a are provided between all of adjacent loudspeakers 15. However, it is not necessary that partition 15a is provided between all of adjacent loudspeakers 15. For example, two loudspeakers 15 are made to be a pair, and partition 15a can be provided between adjacent pairs. Alternatively, partitions on back panel 12 may be appropriately reduced in number. In this way, partition 15a may be provided according to desired sound quality or property.

Next, with reference to FIGS. 1 to 3, outer shapes and dimensions of loudspeakers 15 and loudspeaker system 17 are described in detail.

The outer shape of loudspeaker system 17 may be formed into a long and narrow rectangle. This is because loudspeaker system 17 is disposed in outer frame 63A of display module 62 in electronic apparatus 61 (video equipment such as plasma television and liquid crystal television) as shown in FIG. 4 or FIG. 5.

Then, in this example, loudspeaker 15 is a small loudspeaker generally mounted on portable phones and the like at present time, the outer shape of each loudspeaker 15 is rectangular. The lateral dimension of loudspeaker 15 is mainly about 9 mm, and the vertical dimension of loudspeaker 15 is mainly about 16 mm. The thickness dimension (i.e., overall height) of loudspeaker 15 is mainly about 3 mm. In this way, when loudspeakers 15 having the outer dimension in the longitudinal (vertical) direction of the loudspeaker of 13 mm or more and the outer dimension in the lateral (horizontal) direction of 12 mm or less is used, loudspeaker system 17 having a long, narrow, slim, and rectangle can be obtained.

When eight of such loudspeakers 15 are used, the outer dimension in the lateral direction of loudspeaker system 17 is usually about 12 mm. Therefore, the outer dimension in the lateral direction of loudspeaker system 17 can be made to be 15 mm or less at maximum. In other words, the outer dimension in the lateral direction of loudspeaker system 17 is about 1.25 times as large as the outer dimension in the lateral direction of loudspeakers 15. Therefore, the outer dimension in the lateral direction of loudspeaker system 17 can be made to be within 1.5 times as large as the outer dimension in the lateral direction of the loudspeakers.

As shown in FIG. 1, enclosure 10 is provided with attaching parts 18. In this example, attaching parts 18 are provided in such a manner that they are provided at both end portions of back panel 12 and projects outward from front panel 11. The outer dimension in the vertical direction of loudspeaker system 17 including attaching parts 18 is usually about 180 mm. Therefore, the outer dimension in the vertical direction of loudspeaker system 17 including attaching parts 18 is 150 mm or more at maximum. Attaching part 18 is, for example, a hole or a cut-away portion.

On the other hand, the outer dimension in the thickness direction of loudspeaker system 17 (i.e., overall height) can be made to be usually about 8 mm. Therefore, the outer dimension in the thickness direction of loudspeaker system 17 can be made to be 10 mm or less at maximum. However, the outer dimension in the thickness direction of loudspeaker system 17 is larger than a dimension in which thicknesses of front panel 11 and back panel 12 are added to the outer dimension in the thickness direction of loudspeakers 15.

With the above-mentioned configuration, a ratio of the outer dimension in the vertical direction to the outer dimension in the lateral direction of loudspeaker system 17 (hereinafter, referred to as an aspect ratio) can be made to be 10 or more. Therefore, thin loudspeaker system 17 having an aspect ratio that is higher than a conventional one can be obtained.

Loudspeaker system 17 having this size can be widely mounted on almost all household video equipment from a low-inch size to a high-inch size.

As mentioned above, since loudspeaker system 17 according to this exemplary embodiment is small and thin, electronic apparatus 61 including loudspeaker system 17 can achieve reduction in thickness and size, and space saving that has not been achieved by a conventional one.

In large-inch-size video equipment, as shown in FIG. 4, a large number of loudspeaker systems 17 may be disposed in the vertical direction in addition to disposing each one of loudspeaker systems 17 in left and right of outer frame 63A. With this configuration, high input resistance and high sound pressure-frequency characteristics that are required for large-inch-size video equipment can be achieved.

Furthermore, loudspeaker system 17 according to this exemplary embodiment can be easily mounted on small electronic apparatuses such as portable video equipment by appropriately selecting number, shape, and size of loudspeakers 15.

Then, loudspeaker system 17 to be mounted on small electronic apparatus 61 is described. In this example, examples of small electronic apparatus 61 include portable television receiving set, personal computer, game machine, information-communication device, or the like.

Loudspeaker system 17 shown in FIG. 2 employs eight loudspeakers 15. However, in order to mount loudspeaker system 17 onto small electronic apparatus 61, loudspeaker system 17 of this example employs two or three loudspeakers 15. In this case, the outer dimension in the lateral direction of loudspeaker system 17 is usually about 12 mm. Therefore, the outer dimension in the lateral direction of loudspeaker system 17 in this example can be made to be 15 mm or less. In general, in such loudspeaker system 17, specified impedance is obtained by arranging even number of loudspeakers 15. However, for loudspeaker system 17 mounted onto small electronic apparatus 61, downsizing is more important than an impedance value thereof. Thus, the number of necessary loudspeakers 15 is determined with the priority given to the size of loudspeaker system 17. However, the impedance of individual loudspeakers 15 of this case is determined such that impedance of loudspeaker system 17 is made to be a desired value by connecting loudspeakers 15 in series.

In loudspeaker system 17 of this example, the outer dimension in the vertical direction including attaching parts 18 shown in FIG. 1 is usually about 75 mm. Therefore, the outer dimension in the vertical direction including attaching parts 18 can be made to be 50 mm or more.

With the above-mentioned configuration, the aspect ratio of loudspeaker system 17 in this example can be made to be 6 or more. Consequently, loudspeaker system 17 having a small size, a thin thickness, and a high aspect ratio can be provided.

Then, the outer dimension of loudspeaker system 17 of this example is a suitable when loudspeaker system 17 is mounted onto small electronic apparatus 61. Therefore, small electronic apparatus 61 on which loudspeaker system 17 is mounted can achieving thin thickness, small size, and space saving, which cannot be achieved by a conventional one.

In small electronic apparatus 61 having display module 62 disposed in the middle thereof, loudspeaker systems 17 are disposed in left and right of outer frame 63A of display module 62 as shown in FIG. 4. Also in this case, loudspeaker systems 17 are disposed in a direction in which the longitudinal direction of loudspeaker systems 17 is a vertical direction of small electronic apparatus 61. As a result, small size, thin thickness, and light weight of electronic apparatus 61 can be achieved. Therefore, it is possible to achieve small electronic apparatus 61 that is compact and capable of easily carrying.

Furthermore, also in these small electronic apparatuses 61, as shown in FIG. 4, loudspeaker systems 17 are mounted in such a manner that front slit 11a (shown in FIG. 6) and display module 62 face the same direction. Thus, since outer frame 63A can be made to be thin, further small electronic apparatus 61 can be achieved.

Alternately, in small electronic apparatus 61, loudspeaker system 17 may be disposed in such a manner that front slit 11a and display module 62 face different directions. For example, when front slit 11a is disposed facing the side face of electronic apparatus 61, a sound can be emitted in the direction perpendicular to the display direction of display module 62. This configuration can improve spread of sounds, which is shortcoming peculiar to small electronic apparatuses 61, and can sufficiently exhibit the stereo feeling.

Second Exemplary Embodiment

Figure 9:
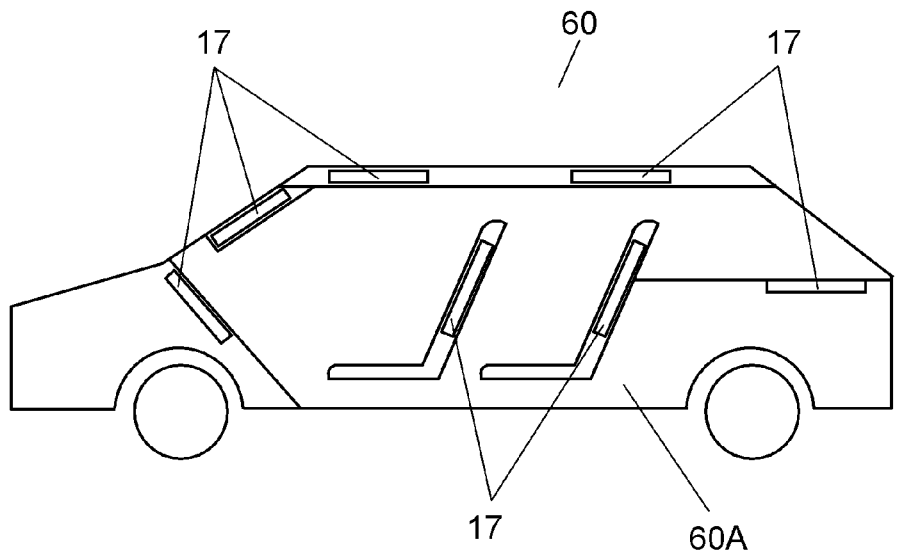
FIG. 9 is a conceptual diagram of a mobile device according to a second exemplary embodiment.

FIG. 9 is a conceptual diagram of a mobile device according to the second exemplary embodiment. Automobile 60 is described as an example of the mobile device in this exemplary embodiment. Automobile 60 includes movable main body 60A and loudspeaker system 17 housed in main body 60A. Loudspeaker system 17 is incorporated into a ceiling, an instrument panel, a sun visor, a seat, a rear tray, or the like, of automobile 60. Loudspeaker system 17 is used as a part of a car audio system and/or a car navigation system. Loudspeaker system 17 according to this exemplary embodiment may be any examples of loudspeaker system 17 according to the first embodiment.

Loudspeaker system 17 may be housed in a place other than the above, such as a headrest, an arm rest, a cockpit, a mirror, a meter, a steering wheel, a pillar, and a door. In this way, loudspeaker system 17 of this embodiment is extremely small, and thus can be easily mounted to any places.

It is desirable that loudspeaker system 17 is mounted close to ears. Thus, a front pillar is an appropriate position for placing loudspeaker system 17. Loudspeaker system 17 of the embodiment has a long and thin shape. Therefore, even if loudspeaker system 17 is housed in the front pillar, it does not influence the width of the front pillar. As a result, the width of the front pillar can be small even if it contains loudspeaker system 17. Consequently, automobile 60 with a favorable view from the driver can be achieved.

Since loudspeaker system 17 is placed near ears, a user can feel sound pressure sufficiently even if the sound pressure-frequency characteristics of loudspeaker system 17 are relatively low. Thus, loudspeakers 15 with a low sound pressure-frequency characteristics as shown in FIG. 3 can be used for loudspeaker system 17.

The above-mentioned configuration can promote reduction in size of a mobile device such as automobile 60. The configuration can also achieve reduction in weight, which contributes to reducing fuel consumption of the mobile device.

Furthermore, loudspeaker system 17 has a high acoustic articulation in the middle- and high-frequency bands and provides sound with less distortion. Therefore, when a loudspeaker dedicated to the reproduction of low frequencies is provided separately, a sound in the low-frequency band can also favorably be reproduced. This configuration creates a comfortable acoustic space in the automobile.

Furthermore, since loudspeaker system 17 has wiring unit 16 on back panel 12 thereof as shown in FIG. 6, point-to-point wiring inside loudspeaker system 17 is not necessary. Since such loudspeaker system 17 is mounted on a mobile device, loudspeaker system 17 does not generate uncomfortable noise even if loudspeaker system 17 undergoes vibration during travelling. Therefore, loudspeaker system 17 can be installed near ears of a user.

In this exemplary embodiment, the description is made of a case where loudspeaker system 17 of the embodiment is mounted in automobile 60, but not limited to the case. For example, loudspeaker system 17 can be incorporated into any devices as long as it is a mobile device such as a bicycle, a motorcycle, a bus, a train, a ship, and an aircraft.

A loudspeaker system of the embodiment is applicable to a loudspeaker system that requires reduction in size and thickness.

What is claimed is:
1. A loudspeaker system comprising:
a plurality of loudspeakers; and
an enclosure surrounding the plurality of loudspeakers,
wherein each of the plurality of loudspeakers includes:
a rectangular frame having a first side and a second side shorter than the first side;
a diaphragm coupled to an outer periphery of the frame;
a magnetic circuit coupled to an inner periphery of the frame and provided with a magnetic gap; and
a voice coil coupled to a periphery of the diaphragm and disposed in the magnetic gap,
wherein the plurality of loudspeakers are disposed in series such that the first sides of the plurality of loudspeakers are in a straight line in the enclosure,
wherein the enclosure includes:
a front panel disposed facing the diaphragms of the plurality of loudspeakers and parallel to the straight line above the diaphragms;
a back panel disposed facing the front panel and parallel to the straight line below the diaphragms of the loudspeakers; and
side panels bonding the front panel and the back panel to each other and provided parallel to the straight line,
wherein the side panels are provided with a front slit communicated with an upper-side space above the diaphragms in the enclosure, and a back slit for emitting a sound emitted to a lower side of the diaphragms to outside of the enclosure, the back slit is disposed at an opposite side to the front slit in the enclosure, and a length of each of the front slit and back slit is substantially equal to a length of its respective side panel,
wherein a length of each of the second sides of the frames of the plurality of loudspeakers is substantially same as a distance between the side panels.
2. The loudspeaker system according to claim 1, wherein the back panel is provided with a wiring unit.
3. The loudspeaker system according to claim 2, wherein the wiring unit is printed wiring.

4. The loudspeaker system according to claim 3, wherein the back panel is formed of a printed board.

5. The loudspeaker system according to claim 1, wherein the front panel and the side panels are made of same material and unitarily formed with each other, or the back panel and the side panels are made of same material and unitarily formed with each other.

6. The loudspeaker system according to claim 1, wherein the loudspeakers are fixed to the back panel.

7. The loudspeaker system according to claim 1, wherein the loudspeakers are electrically connected to the back panel.

8. The loudspeaker system according to claim 1, wherein the enclosure is provided with partitions for partitioning the individual loudspeakers.

9. The loudspeaker system according to claim 8, wherein the partitions are provided on at least any one of the front panel and the back panel.

10. The loudspeaker system according to claim 3, wherein each of the loudspeakers includes a terminal having a spring property, and the terminal is urged to the printed wiring for electrically connecting each of the loudspeakers to the printed wiring.

11. The loudspeaker system according to claim 1, wherein a first side of each of the plurality of loudspeakers is longer than a second side of each of the plurality of loudspeakers.

12. The loudspeaker system according to claim 1, wherein attaching parts for mounting the loudspeaker on a set are provided on both ends of the enclosure.

13. The loudspeaker system according to claim 1, wherein the outer dimension in the thickness direction of the enclosure is larger than a dimension including the outer dimension in the thickness direction of the loudspeakers plus thicknesses of the front panel and the back panel, and the outer dimension in the thickness direction of the enclosure is 10 mm or less.

14. The loudspeaker system according to claim 1, wherein the enclosure has a first side and a second side shorter that the first side, and the outer dimension of the second side of the enclosure falls within 1 to 1.5 times, inclusive of the outer dimension in the lateral direction of the loudspeakers.

15. The loudspeaker system according to claim 1, wherein eight of the loudspeakers are housed in the enclosure.

16. The loudspeaker system according to claim 1, wherein at least one of the front slit and the back slit is covered with a dust-proof net.

17. An electronic apparatus comprising an outer frame, a loudspeaker system as defined in claim 1 housed in the outer frame.

18. The electronic apparatus according to claim 17, further comprising a display module.

19. The electronic apparatus according to claim 18, wherein the loudspeaker system is one of loudspeaker systems, the electronic apparatus comprises the loudspeaker systems, each of the enclosures of the loudspeaker systems has a first side and a second side shorter than the first side, the enclosures of the loudspeaker systems are disposed in left and right parts of an outer frame of the display module, and mounted in such a manner that the first side of the enclosure is oriented along a vertical direction of the electronic apparatus.

20. The electronic apparatus according to claim 18, wherein the enclosure of the loudspeaker system has a first side and a second side shorter that the first side, the enclosure is disposed in an upper part or a lower part of the outer frame of the display module, and mounted in such a manner that the first side of the enclosure is oriented along a lateral direction of the electronic apparatus.

21. The electronic apparatus according to claim 18, wherein the enclosure is disposed in such a direction that a sound is emitted in a direction that is a same direction as a display direction of the display module.

22. The electronic apparatus according to claim 18, wherein the enclosure is disposed in such a direction that a sound is emitted in a direction that is perpendicular to the display direction of the display module.

23. A mobile device comprising:
a movable main body, and
the loudspeaker system as defined in claim 1 housed in the main body.

* * * * *